Feb. 7, 1967 W. D. TEAGUE, JR 3,302,229
SYSTEM FOR LOADING AND UNLOADING SHIPS
Filed Aug. 5, 1964 2 Sheets-Sheet 2

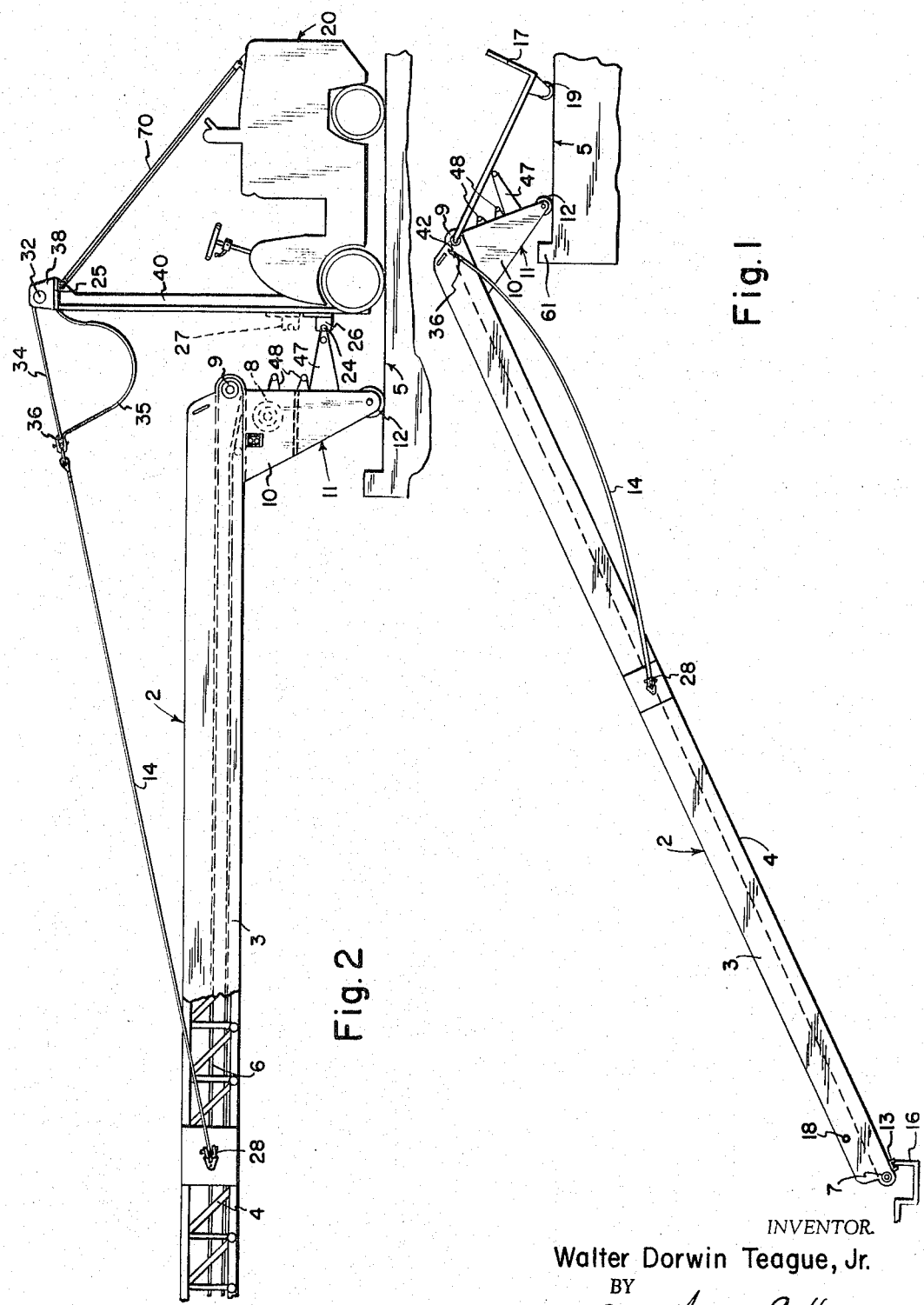

INVENTOR.
Walter Dorwin Teague, Jr.
BY
Curtis, Morris & Safford
ATTORNEYS

United States Patent Office 3,302,229
Patented Feb. 7, 1967

3,302,229
SYSTEM FOR LOADING AND UNLOADING SHIPS
Walter Dorwin Teague, Jr., Glen Goin Road,
Alpine, N.J. 07620
Filed Aug. 5, 1964, Ser. No. 387,673
4 Claims. (Cl. 14—72)

This invention relates to material handling and gangplank equipment, and more in particular, to such equipment which is portable and may be used for loading and unloading the passengers and the supplies and cargo of ships.

An object of this invention is to provide conveyors and the like of the type which may be used for loading or unloading ships, and which can be moved easily and efficiently into and from an operative position. A further object is to provide means for installing such conveyors and the like at a variety of different angles from the horizontal, depending upon the relative heights of the wharf and the ship's deck. A further object is to provide such means for use as a passenger ramp as well as for the loading or unloading of cargo. A still further object is to provide means at the dock end of the conveyor to permit it to move in accordance with the normal motion of the ship. These and other objects will be in part obvious and in part pointed out below.

In the drawings:

FIGURE 1 is a side elevation of one embodiment of the invention;

FIGURES 2 and 3 are side elevations with parts broken away and showing the manner in which the equipment of FIGURE 1 is moved and installed; and, FIGURES 4 and 5 are used to show the construction of another embodiment of the invention which differs from that of FIGURE 1.

Figure 3:
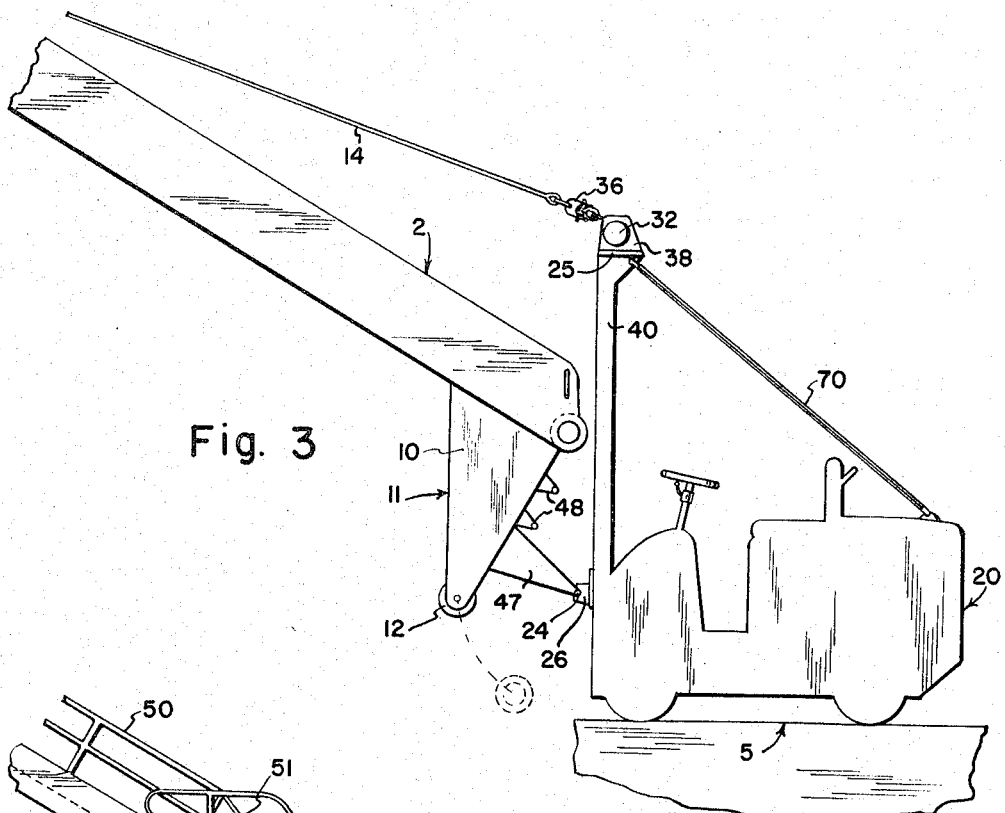

Referring to FIGURE 1 of the drawings, a conveyor assembly 2 has a frame 4 with sheet metal side covers 3. Conveyor assembly 2 has a conveyor belt 6 mounted at its ends upon rolls 7 and 9 (see also FIGURE 2). The right-hand end of the conveyor assembly is supported upon a wharf 5 by a support structure 11 having a pair of wheels 12 and a pair of heavy metal side plates 10 which are rigidly attached to the frame 4 and upon which wheels 12 are mounted. The conveyor belt 6 is driven by an electric motor 8 (shown in broken lines) which is rigidly mounted between side plates 10 and has switch and control auxiliaries of known construction. When positioned for use, the conveyor assembly is supported upon the wharf by rollers 12 and at the ship by an inverted channel 13 which is attached to the bottom of the conveyor frame and runs the width of it. This engages the vertical metal plate or stringer angle 16 that forms the edge of the ship's deck. In addition, eye bolts 18 are provided on each side of the conveyor, for the attachment of tackles to secure the conveyor in operating position.

A baggage receiving or collecting rack 17 is removably and pivotally attached to the conveyor assembly along the terminal edge of conveyor belt 6, and has a pair of rollers 19 which rest upon the wharf. The receiving rack collects the baggage as it is discharged from the conveyor over roller 9.

Referring now to FIGURE 2, the conveyor assembly 2 may be moved from place to place upon the dock by a lift truck 20. Lift truck 20 has a bracket 26 which is adapted to interengage and lock with a pair of pins 24 upon a pair of horizontal brackets 47 which project from the support structure 11 of the conveyor assembly. Bracket 26 is a special attachment which replaces the lifting fork on the lift truck and which is moved up and down by the operator in the same manner as the lifting fork of the usual type of fork lifting trucks. Pins 24 are aligned with one another and are engaged rotatably by bracket 26, so that the ship end of the conveyor can be raised or lowered by pivoting it about the pins.

The conveyor assembly also has a pair of bridles 14 which extend along the opposite sides of the conveyor assembly and each of which is attached at one end to a lug 28 rigidly mounted upon the side of frame 4. The other end of each of bridles 14 is connected through a yoke 36 to a cable 34. The cables 34 are connected to and adapted to be wound upon a drum 32 of a winch 38 which is rigidly mounted upon a base plate 25 at the top of the mast assembly 40 of the lift truck. Winch 38 is of a known type forming part of the lift truck 20 and may be operated to rotate drum 32 so as to wind and unwind cables 34. Hence, the conveyor assembly may be pivoted upwardly about pins 24 to the position shown in FIGURE 3 by turning drum 32 to wind cables 34. It may be lowered by reversing the rotation of the drum, until wheels 12 again contact wharf 5. The conveyor may be lowered below the position of FIGURE 2, if the bracket 26 is raised to the position 27, shown in broken lines. Thus the angle of the conveyor may be controlled and its far end either raised or lowered by the action of the winch, providing that the bracket 26 is raised high enough to allow wheels 12 to be clear of the ground.

In actual operation, the fork truck assumes a position at the end of the conveyor having the lock members. Bracket 26 is adjusted so that it is at the same level as pins 24 which it engages. Cables 34 are attached to yokes 36 which are permanently attached to the bridles. When the winch is operated to tighten the cables slightly, the conveyor assumes a horizontal position, similar to that shown in FIGURE 2. To move the conveyor apparatus, the wheels are raised from the dock, either by raising the bracket 26 to position 27 (FIGURE 2), by tightening the winch to raise the conveyor to the position shown in FIGURE 3 or by a combination of both. The truck then drives to the edge of the dock at a point opposite the embarcation point of the ship and operates the winch to raise or lower the conveyor, so that the end of it can be hooked over the ship's stringer angle 16 and secured. If necessary, the bracket 26 is raised to provide clearance for wheels 12. After the ship end of the conveyor is in position, bracket 26 is lowered until the wharf end of the conveyor rests upon its wheels 12. The truck is then disengaged from the conveyor, the bridles and their yokes being stored along the sides of the conveyor and resting in brackets 42. Steps 48, attached to support members 10 and 11, provide a place for the operator to stand while connecting or disconnecting the cables and the yokes. The truck may then be replaced by baggage collector 17, as shown in FIGURE 1. The removal of the conveyor apparatus from its operating position is accomplished by replacing the baggage collector with the fork lift truck and exactly reversing the procedure used in positioning the conveyor.

Figure 4:
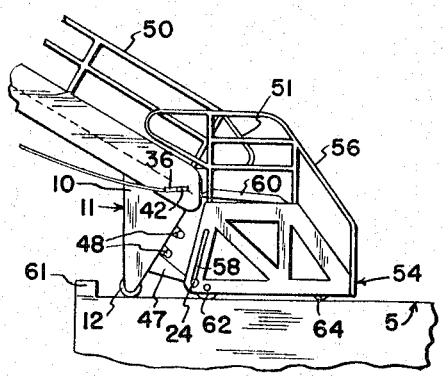
Figure 5:
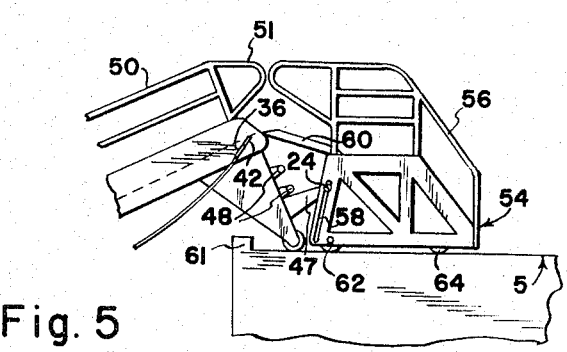

In the embodiment of FIGURES 4 and 5, the apparatus is a passenger gangplank of a gangway. A railing 50 is attached to the frame 4 along each side of the gangway, with its end portion 51 designed so as not to interfere with the lift truck when the gangway is attached to it. A stepway 54 having a railing 56 along each side is attached to the conveyor by horizontal bracket 47. Railings 56 are positioned further apart than railings 50, so that when the gangway is in the raised position (FIGURE 4) they do not interfere with one another. Pins 24, which are also used to attach the gangway to the lift truck fit into a pair of slots 58 in the frame of the stepway. The positioning of the gangway between the wharf and the side of a ship is performed in the same manner in which the conveyor 2 is so positioned. When the gangway is properly positioned with its wharf and supported by rollers 12, the stepway 54 is rolled into place, as shown in FIGURES 4 and 5, and pins 24 are positioned in slots 58 so as to provide the interconnection as shown. The length of these slots permits the conveyor to rest at a variety of angles, depending upon the slope between the pier and the ship's deck. The space between the walkway and the gangway is covered by a plate 60, which is hinged at one end along the end of the gangway ramp, with its other end resting upon the top platform of the stepway.

The action of tides, currents, and waves usually causes some motion of a docked ship with respect to its wharf. To account for this, the end of the conveyor (and of the gangway) resting upon the pier is left free to move toward the edge of the pier or away from it on wheels 12. A parapet 61 prevents it from falling over the edge. In addition, the structures to which it is attached are able to move with it, the luggage carrier having wheels 19 and the stepway having a pair of wheels 62 and a pair of casters 64. Furthermore, the pivotal means of attachment of the conveyor to the carrier and the gangway to the stepway permits changes in the angle of the conveyor (or gangway) apparatus to the horizontal.

It is a feature of the present invention that the fork-lift truck is only required in connection with the conveyor-gangway during the short periods of positioning and removing. During the period of use of the conveyor (or gangway), the truck may be employed in other tasks on the pier. It is contemplated that the jaws will be easily removable and can be replaced with the forks that the truck uses, for example, when it is engaged in lifting and carrying large pieces of cargo.

Because of the undesirable or unsafe consequences that might arise if the conveyor (or gangway) were raised or lowered to too steep an angle, a system of stops is employed to limit the range of angles. A pair of safety lines 35, attached to the yokes 36 and to the mast 40, prevent the conveyor (or gangway) from being lowered below a certain pre-determined angle. A further limitation on the downward slope of the conveyor is provided by a pair of stops in bracket 26, which limit the distance that they can be raised above the ground. For most purposes, it would seem desirable to limit the conveyor (or gangway) to a range from about 30° below the horizontal to 25° above it.

It is contemplated that certain modifications in the fork-lift truck may be necessary to adapt it for use with the conveyor. A cable 70, supporting the mast, is attached near the rear of the truck. In addition, ballast is added to the rear of the truck to balance the torque of the conveyor (or gangway).

What is claimed is:

1. In apparatus for loading and unloading ships at the side of a wharf, the combination of, a gangway structure which extends from the wharf to the edge of the ship and rests thereon, bracket means rigidly attached to the wharf end of said gangway structure including roller means which provides movable support upon the wharf for the wharf end of the gangway structure, gangway means on said gangway structure between the ship end thereof and the wharf end thereof, a lift truck having a lifting bracket, means pivotally connecting said lifting bracket to said bracket means on said gangway structure, said lift truck including means operative to raise and lower said lifting bracket thereby to raise and lower the wharf end of said gangway structure with respect to the wharf, bridle means connected to the opposite sides of said gangway structure remote from the wharf end, and means on said lift truck coupled to said bridle means to raise and lower said ship end of said gangway structure relative to said lift truck.

2. Apparatus as described in claim 1 wherein said gangway structure has hand rails and a central walk.

3. Apparatus as described in claim 1 wherein said lift truck has a drum and cables connected at one end to said bridle means and at the other end is wound on said drum and is connected thereto.

4. A system for loading and unloading ships from a wharf which comprises, a gangway which is positioned for use between the edge of the wharf and the edge of a ship, said gangway having a support bracket rigidly mounted upon the wharf end of the gangway and providing support upon the wharf for that end of the gangway, and a lift truck upon the wharf, said lift truck having a lifting bracket which has lifting means pivotally connected to said support bracket on the wharf end of the gangplank, said lifting means being movable vertically to raise and lower said support bracket and the wharf end of the gangway to and from the position wherein said support bracket rests upon the wharf, said lift truck and gangway having interconnecting cable means extending between the lift truck and a remote position on the gangway, and said lift truck having winding means to wind said cable means thereby to provide lifting forces through said cable means to said gangway.

References Cited by the Examiner
UNITED STATES PATENTS 2,617,131  11/1952  Harris _____ 14—71
2,627,960  2/1953  Eberle _____ 198—233 X JACOB L. NACKENOFF, *Primary Examiner.*

CHARLES E. O'CONNELL, *Examiner.*